United States Patent
Lyle

(10) Patent No.: US 6,470,359 B1
(45) Date of Patent: Oct. 22, 2002

(54) FAST TECHNIQUE FOR RECOVERING AN INDEX ON AN AUXILIARY TABLE

(75) Inventor: Robert William Lyle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/321,675

(22) Filed: May 28, 1999

Related U.S. Application Data

(60) Provisional application No. 60/101,729, filed on Sep. 24, 1998.

(51) Int. Cl.[7] .............................................. G06F 12/16
(52) U.S. Cl. ....................................... 707/202; 707/205
(58) Field of Search ............................. 707/1, 2, 8, 10, 707/202, 205, 109

(56) References Cited

U.S. PATENT DOCUMENTS

| | | | |
|---|---|---|---|
| 4,509,119 A | 4/1985 | Gumaer et al. | |
| 4,949,388 A | 8/1990 | Bhaskaran | |
| 4,961,134 A | 10/1990 | Crus et al. | |
| 5,043,866 A | 8/1991 | Myre, Jr. et al. | |
| 5,222,235 A | 6/1993 | Hintz et al. | |
| 5,247,672 A | 9/1993 | Mohan | |
| 5,261,088 A | 11/1993 | Baird et al. | |
| 5,291,583 A | 3/1994 | Bapat | |
| 5,295,188 A | 3/1994 | Wilson et al. | |
| 5,396,623 A | 3/1995 | McCall et al. | |
| 5,408,654 A | 4/1995 | Barry | |
| 5,416,915 A | 5/1995 | Mattson et al. | |
| 5,418,921 A | 5/1995 | Cortney et al. | |
| 5,418,940 A | 5/1995 | Mohan | |
| 5,435,004 A | 7/1995 | Cox et al. | |
| 5,452,299 A | 9/1995 | Thessin et al. | |
| 5,455,944 A | 10/1995 | Haderle et al. | |
| 5,517,641 A | 5/1996 | Barry et al. | |
| 5,566,329 A | 10/1996 | Gainer et al. | |
| 5,579,499 A | 11/1996 | Fecteau et al. | |
| 5,579,515 A | 11/1996 | Hintz et al. | |
| 5,630,093 A | 5/1997 | Holzhammer et al. | |
| 5,666,560 A | 9/1997 | Moertl et al. | |
| 5,684,986 A | 11/1997 | Moertl et al. | |
| 5,687,343 A | 11/1997 | Fecteau et al. | |
| 5,721,915 A | 2/1998 | Sockut et al. | |
| 5,727,197 A | 3/1998 | Burgess et al. | |
| 5,732,402 A | 3/1998 | Lehman | |
| 5,737,601 A | 4/1998 | Jain et al. | |
| 5,742,806 A | 4/1998 | Reiner et al. | |
| 5,742,810 A | 4/1998 | Ng et al. | |
| 5,758,357 A | 5/1998 | Barry et al. | |
| 5,761,667 A | 6/1998 | Koeppen | |
| 5,983,213 A | * 11/1999 | Nakano et al. | 707/1 |
| 5,999,943 A | * 12/1999 | Nori et al. | 707/104 |
| 6,061,678 A | * 5/2000 | Klein et al. | 707/3 |
| 6,105,017 A | * 8/2000 | Kleewein et al. | 707/2 |

FOREIGN PATENT DOCUMENTS

JP  8-167852  6/1996

OTHER PUBLICATIONS

IBM Technical Disclosure Bulletin, "Method For Storing Large Objects in a Relational Database," vol. 35, No. 4A, pp. 72–75, Sep. 1992.

(List continued on next page.)

Primary Examiner—John Breene
Assistant Examiner—Khanh B Pham
(74) Attorney, Agent, or Firm—Sughrue Mion, PLLC

(57) ABSTRACT

A method, apparatus, and article of manufacture for a computer implemented index recovery system An auxiliary index is recovered in a database stored on a data storage device connected to a computer. An identifier is maintained in each entry of a space map that identifies a large object to which the page associated with that entry is allocated. An indicator is maintained in the entry of the space map indicating whether the page associated with that entry is the first page allocated to the large object. The identifier and the indicator in each entry of the space map are used to build the auxiliary index for locating each large object.

18 Claims, 7 Drawing Sheets

OTHER PUBLICATIONS

IBM Technical Disclosure Bulletin, "Reorganization Flags For Table Indexes," vol. 35, No. 5, pp. 156–157, Oct. 1992.

IBM Technical Disclosure Bulletin, "Technique to Allow DB2 Utilities and Commands to Run While SQL Applications Have a Table Space Locked," vol. 36, No. 09A, pp. 499–501, Sep. 1993.

IBM Technical Disclosure Bulletin, "Spanning Temporary Reorg Files," vol. 36, N. 06A, p. 159, Jun. 1993.

IBM Technical Disclosure Bulletin, "Segmented Relational Database Tables," vol., 38, No. 07, pp. 219–220, Jul. 1995.

IBM Technical Disclosure Bulletin, "Mapping a Relational Database to a Hierarchical File System," vol. 38, No. 10, pp. 309–311, Oct. 1995.

IBM Technical Disclosure Bulletin, "Fine Granularity Locking to Support High Data Availability in a Client/Server Database Management System," vol. 38, No. 02, pp. 143–145, Feb. 1995.

Joon Seek Kim, et al., "Mapping Parameter Estimation Using Integral Projections And Segmented Moving Objects in Object–Oriented Analysis–Synthesis Coding," Optical Engineering, vol. 35, No. 1, pp. 156–165, Jan. 1996.

MJ Carey, et al., "Object And File Management in The EXODUS Extensible Database System," Proceedings of Very Large Data Bases. Twelfth International Conference on Very Large Data Bases, Kyoto, Japan, pp. 91–100, Aug. 25–28, 1986.

ML McAuliffe, et al., "Towards Effective and Efficient Free Space Management," 1996 ACM SIGMOD International Conference on Management of Data, Montreal, Quebec, Canada, Jun. 4–6, 1996.

C. Mohan, "Disk Read–Write Optimizations and Data Integrity in Transaction Systems Using Write–Ahead Logging," Proceedings of the Eleventh International Conference on Data Engineering (Cat. No. 95CH35724), Taipei, Taiwan, Mar. 6–10, 1995.

Ki Sik Pang, et al., "An Efficient Recovery Scheme For Large Data in Multimedia DBMS," Journal of the Korea Information Science Society, vol. 22, No. 2, pp. 206–217, Feb. 1995.

C. Mohan, et al., "Algorithms For Flexible Space Management in Transaction Systems Supporting Fine–Granularity Locking," Advances in Database Technology—EDBT '94. 4th International Conference on Extending Database Technology, Cambridge, UK, Mar. 28–31, 1994.

Martin Marshall, "Time Warner Big on Oracle Objects. (Testing Oracle 8's Ability to Move Large Object Blocks)," (Company Operations), (Brief Article), CommunicationsWeek Issue: n676, pp. 1–3, Aug. 11, 1997.

HweeHwa Pang, "Tertiary Storage in Multimedia Systems: Staging or Direct Access?", Multimedia Systems, vol. 5, Issue: 6, pp. 386–399, Dec. 1, 1997.

Dr. Michael Stonebraker, "The Empire Strikes Back: DB2 Universal Database," http://www.oreview.com/9704side-.htm, pp. 1–7, 1997.

GH Sokut, "A Method For On–Line Reorganization of a Database," IBM Systems Journal, vol.. 36, No. 3 pp. 411–436, 1997.

H. Koide, et al., "A New Memory Allocation Method For Shared Memory Multiprocessors With Large Virtual Address Space," Concurrency: Practice and Experience, vol. 9, No. 9, pp. 897–914, Sep. 1997.

* cited by examiner

FAST TECHNIQUE FOR RECOVERING AN INDEX ON AN AUXILIARY TABLE

PROVISIONAL APPLICATION

This application claims the benefit of U.S. Provisional Application No. 60/101,729, entitled "IMPROVED DATABASE SYSTEM," filed on Sep. 24, 1998, by Charles R. Bonner et al., which is incorporated by reference herein.

CROSS-REFERENCE TO RELATED APPLICATIONS

This application is related to the following copending and commonly-assigned patent applications:

application Ser. No. 09/322,312, entitled "USING AN EPOCH NUMBER TO OPTIMIZE ACCESS WITH ROWID COLUMNS AND DIRECT ROW ACCESS," filed on same date herewith, by Robert W. Lyle et al.;

application Ser. No. 09/322,292, entitled "STORING AN UNCOMPRESSED DATA LENGTH IN A LOB MAP TO SPEED SUBSTRING ACCESS WITHIN A LOB VALUE," filed on same date herewith, by Robert W. Lyle et al.;

application Ser. No. 09/322,287, entitled "A TECHNIQUE TO AVOID PROCESSING WELL CLUSTERED LOB'S DURING REORGANIZATION OF A LOB TABLE SPACE," filed on same date herewith, by Charles R. Bonner et al.;

application Ser. No. 09/322,317, entitled "AN OPTIMIZED TECHNIQUE FOR PREFETCHING LOB TABLE SPACE PAGES," filed on same date herewith, by Charles R. Bonner et al.;

application Ser. No. 09/322,286, entitled "A TECHNIQUE FOR CREATING A UNIQUE QUASI-RANDOM ROW IDENTIFIER," filed on same date herewith, by Robert W. Lyle et al.;

application Ser. No. 09/322,698, entitled "A TECHNIQUE FOR DETERMINING AN AGE OF AN OLDEST READING TRANSACTION WITHIN A DATABASE OBJECT," filed on same date herewith, by Robert W. Lyle et al.;

application Ser. No. 09/372,315, entitled "AN EFFICIENT TECHNIQUE TO DEFER LARGE OBJECT ACCESS WITH INTERMEDIATE RESULTS," filed on same date herewith, by Christine M. Lee et al.; and application Ser. No. 09/322,316, entitled "A TECHNIQUE FOR INPLACE REORGANIZATION OF A LOB TABLE SPACE," filed on same date herewith, by Charles R. Bonner et al.; each of which is incorporated by reference herein.

BACKGROUND OF THE INVENTION

1. Field of the Invention

This invention relates in general to computer-implemented database systems, and, in particular, to recovering an index on an auxiliary table.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. Tables are assigned to table spaces. A table space is associated with direct access storage devices (DASD), and, thus, tables, are stored on DASD, such as magnetic or optical disk drives for semi-permanent storage.

A table space can be a system managed space (e.g., an operating system file system) or a database managed space. Each table space is physically divided into equal units called pages. Each page, which may contain, for example, 4K bytes, holds one or more rows of a table and is the unit of input/output (I/O). The rows of a table are physically stored as records on a page. A record is always fully contained within a page and is limited by page size. As users move towards working with image data and other large data objects, storing data in conventional records becomes difficult.

An index is an ordered set of references to the records or rows in a database file or table. The index is used to access each record in the file using a key (i.e., one of the fields of the record or attributes of the row). However, building an index for a large file can take a considerable amount of elapsed time. The process involves scanning all records in the file, extracting a key value and record identifier (rid) value from each of the records, sorting all of the key/rid values, and then building the index from the sorted key/rid values. Typically, the scanning, sorting, and index build steps are performed serially, which can be time consuming in the case of a large database file.

Traditionally, a RDBMS stored simple data, such as numeric and text data. In a traditional RDBMS, the underlying storage management has been optimized for simple data. More specifically, the size of a record is limited by the size of a page, which is a fixed number (e.g., 4K) defined by a computer developer. This restriction in turn poses a limitation on the length of columns of a table. To alleviate such a restriction, most computer developers today support a new built-in data type for storing large objects (LOBs). Large objects, such as image data, typically take up a great deal of storage space.

When a RDBMS stores LOBs, an index may be used to access the LOBs efficiently. However, when computer systems fail, the index could be corrupted or destroyed. In this case, recovery of the index, which involves rebuilding the index, can be very time consuming because each page that was allocated to storing each LOB must be read.

Therefore, there is a need in the art for an improved technique of recovering an index on an auxiliary table.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented index recovery system.

In accordance with the present invention, an auxiliary index is recovered in a database stored on a data storage device connected to a computer. An identifier is maintained in each entry of a space map that identifies a large object to which the page associated with that entry is allocated. An indicator is maintained in the entry of the space map indicating whether the page associated with that entry is the first page allocated to the large object. The identifier and the indicator in each entry of the space map are used to build the auxiliary index for locating each large object.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
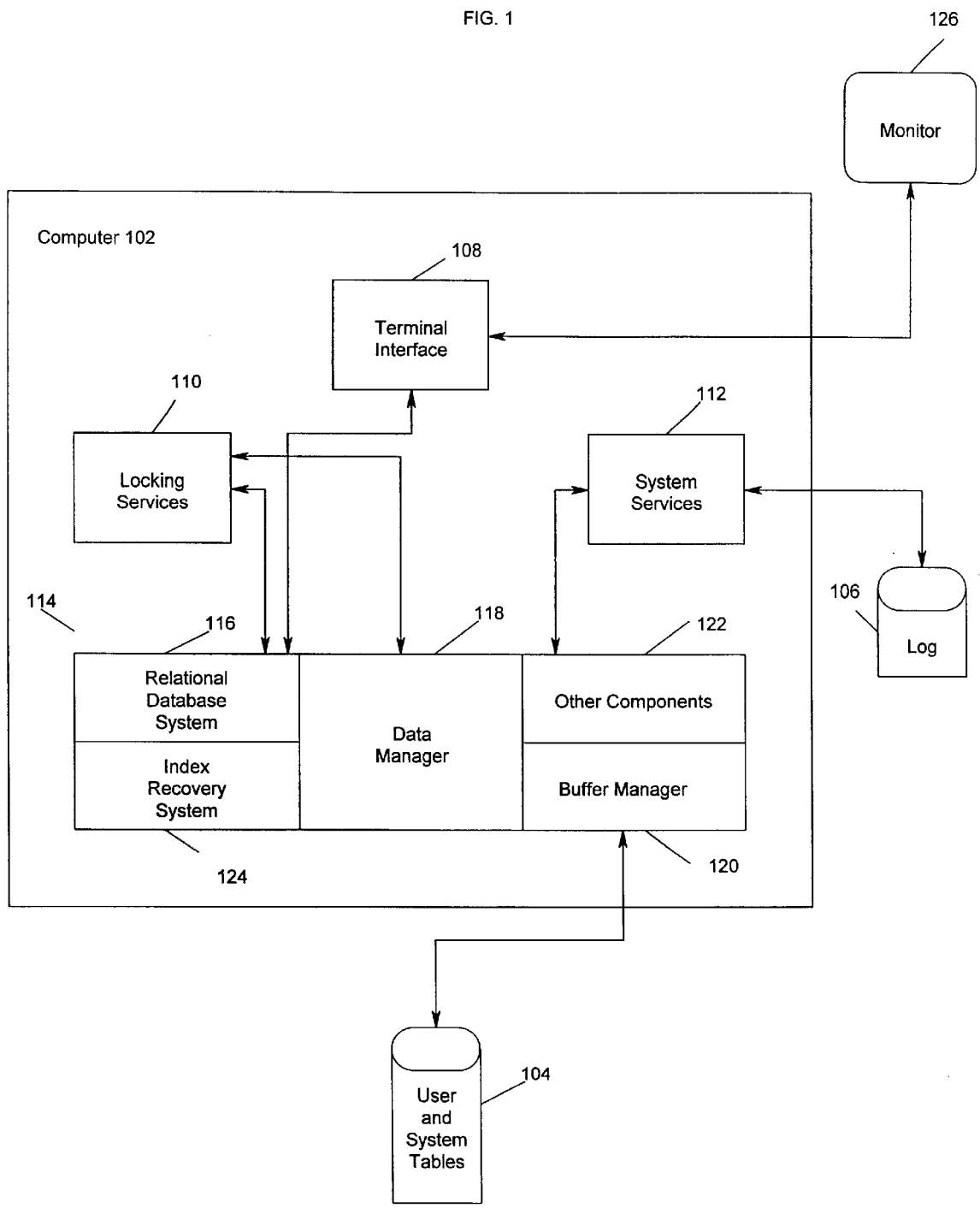
FIG. 1 is a block diagram illustrating an exemplary computer hardware environment that could be used in accordance with the present invention.

FIG. 1 is a block diagram illustrating an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the MVS® or OS/390® operating systems. Those skilled in the art will recognize, however, that the present invention has application program to any RDBMS software, whether or not the RDBMS software uses SQL.

As illustrated in FIG. 1, the DB2® system for the MVS® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Index Recovery System 124, and other components 122 such as an SQL compiler/interpreter. These submodules support the functions of the SQL language, i.e. definition, access control, interpretation, compilation, database retrieval, and update of user and system data. The index recovery system 124 works in conjunction with the other submodules to recover an index.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Recovering An Index on an Auxiliary Table

The index recovery system 124 of the present invention includes additional information within a space map page in a LOB table space. In addition to recording whether a page is allocated or deallocated, the index recovery system 124 indicates for each page in the space map page whether that page is the first page allocated to a LOB. Storing this information with a LOB low-level space map page enables the index recovery system 124 to recover an index on an auxiliary table by reading only the LOB low-level space map pages, instead of all pages in the LOB table space.

Figure 2:
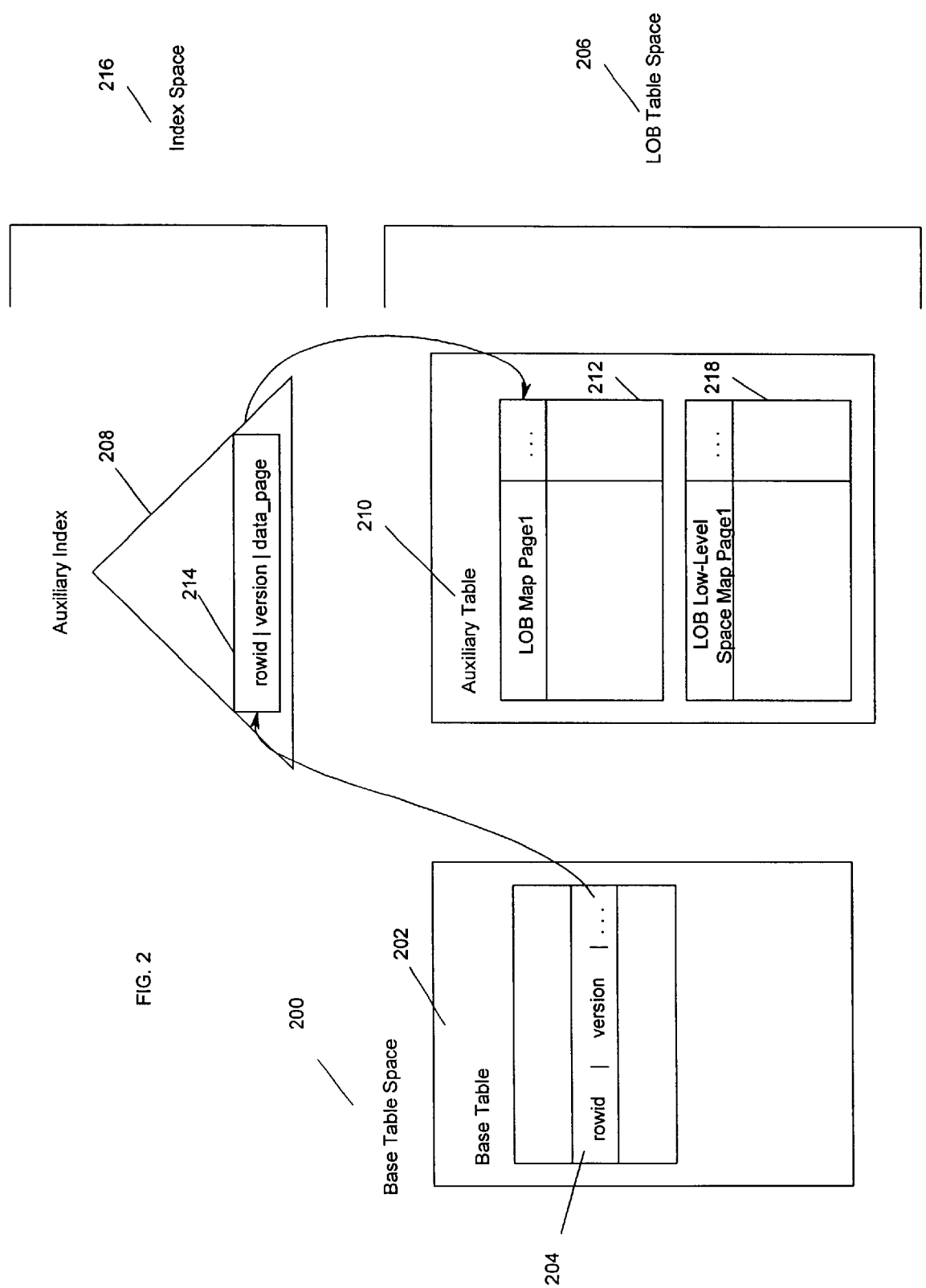
FIG. 2 is a block diagram illustrating an exemplary base table space and LOB table space.

FIG. 2 is a block diagram illustrating an exemplary base table space 200 and LOB table space 206. A base table space 200 contains a base table 202. The base table 202 is a table definition that logically contains rows and columns of data. For example, row 204 contains columns for a row identifier ("rowid"), a version number ("version"), and other columns (indicated with the ellipses). The index recovery system 124 stores LOB values in LOB columns outside of the base table 202. The LOB columns may be stored outside of the base table 202, but they still are logically part of the base table 202. The LOB values are stored in a LOB table space 206 that is completely separate from the base table space 200 in which the base table 202 is defined.

The LOB table space 206 contains an auxiliary table 210. The index recovery system 124 requires that users define an auxiliary table 210 within the LOB table space 206 to contain the actual LOB values. The auxiliary index 208 is created on the auxiliary table 210 in index space 216. The data manager 118 has been extended to find LOB values. In particular, the data manager 118 uses the auxiliary index 208 to quickly find the LOB values for a specific row. In particular, the auxiliary index contains keys 214, which indicate the first LOB map page, such as LOB Map Page1 212. The first LOB map page acts as a directory to the LOB map and LOB pages of a LOB and assists with accessing the LOB data. In addition to LOB Map pages, such as LOB Map Page1 212, the auxiliary table 210 contains LOB low-level space map pages, such as LOB Low-Level Space Map Page1 218. LOB low-level space map pages assist in allocating and deallocating LOB pages. A high-level space map identifies the low-level space map pages.

Figure 3:
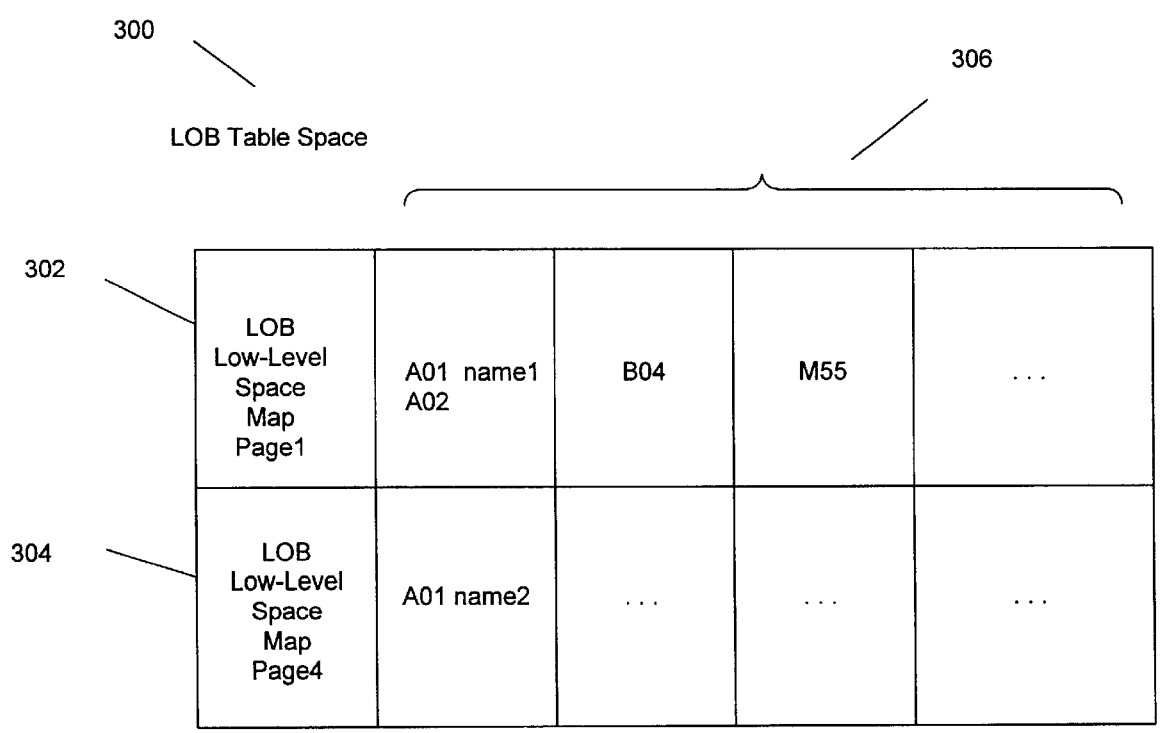
FIG. 3 is a block diagram illustrating an exemplary table space containing LOB low-level space map pages and LOB pages.

FIG. 3 is a block diagram illustrating an exemplary table space containing LOB low-level space map pages and LOB pages. A table space 300 contains a number of LOB low-level space map pages 302, 304. Each LOB low-level space map page 302, 304 covers a number of LOB pages 306. Each LOB page is allocated to one LOB, even if the LOB uses only a portion of the LOB page. For example, one LOB may be stored on 17 and a half LOB pages, but the LOB page that is half used is not allocated to any other LOB. Each LOB low-level space map page 302, 304 covers a fixed range of LOB pages 306. A LOB low-level space map page 302, 304 identifies the LOB pages 306 that have not yet been allocated to a LOB. When inserting a LOB, one or more LOB low-level space map pages 302, 304 are accessed to find LOB pages that may be allocated to the LOB. All LOB pages within a single table space have the same page size. A page may contain, for example, 4096 bytes.

When the auxiliary index 208 becomes broken or otherwise unavailable, recovering the auxiliary index 208 according to conventional techniques becomes extremely expensive because the entire LOB table space 206 is scanned to correctly rebuild the auxiliary index 208. On the other hand, the index recovery system 124 greatly reduces the number of pages of the LOB table space 206 accessed to recover the auxiliary index 208. In fact, the index recovery system 124, rather than accessing the LOB pages, accesses only the space map pages in the LOB table space.

The index recovery system 124 uses the combination of the row identifier and an internal version number as a unique identifier used to locate any particular LOB value. Consequently, the auxiliary index 208 on the auxiliary table 210 has key entries composed of the row identifier followed by the version number. For example, key entry 214 contains the "rowid" and "version" for row 204. When a LOB value is to be accessed, the row identifier and version number from a row 204 of the base table 202 that has a LOB attribute is matched to a key entry 214 in the auxiliary index 208. The key entry 214 contains a "data_page" value that indicates the LOB page on which the LOB value begins.

Figure 4:
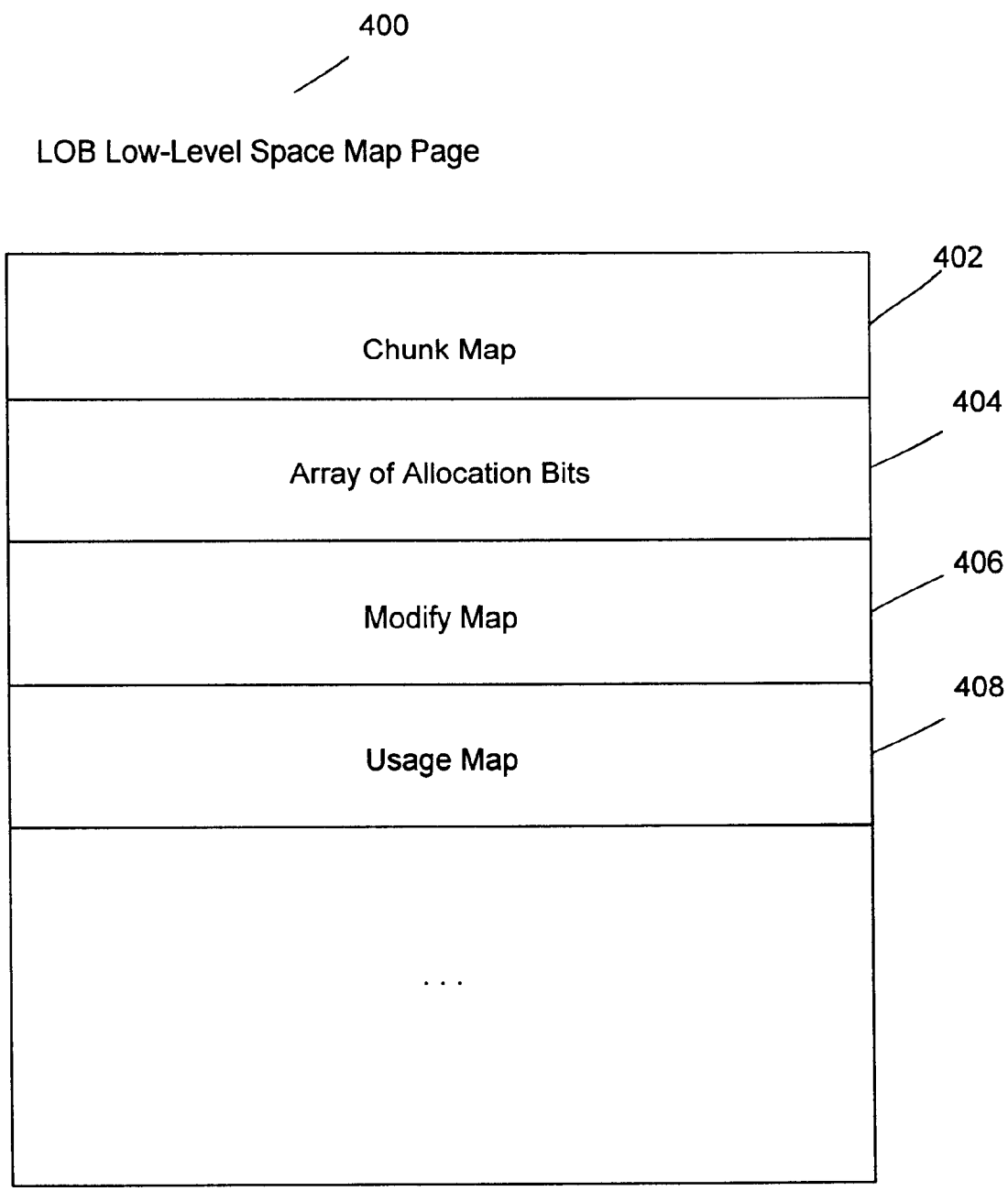
FIG. 4 is a block diagram illustrating an exemplary LOB low-level space map page.

The index recovery system 124 stores the combination of the row identifier and version number used to locate any particular LOB value within every space map page entry. FIG. 4 is a block diagram illustrating an exemplary LOB low-level space map page 400. LOB low-level space map page 400 contains a chunk map 402, an array of allocation bits 404, a modify map 406, a usage map 408, and other information, as indicated by the ellipses. The chunk map 402 is a series of two bit entries that indicate for each chunk whether that chunk is empty, partially used, fully used, or allocated to a single LOB. The array of allocation bits 404 has two bit entries that indicate whether each LOB page covered by the LOB low-level space map page 400 is unallocated, has been deallocated, is allocated, or is allocated and is the first page allocated to a LOB. The modification map 406 indicates for each page covered by the LOB low-level space map page 400 whether that page has been modified since the last time the page was copied. The usage map 408 has an entry for each page covered by the LOB low-level space map page 400. For each page, the usage map 408 provides a row identifier and version number to uniquely identify a LOB to which that page is allocated. Moreover, the usage map 408 indicates, for each page that is the first page allocated to a LOB, whether the LOB is well inserted or "perfectly chunked" (i.e., an organization state).

Additionally, the LOB low-level space map page 400 maintains LOB page numbers and an attribute that identifies the combination of the row identifier and the version number used to identify a LOB value. The unique identifier of the LOB value along with the LOB page number, are used to identify that a particular LOB value is on a particular LOB page. Because these two pieces of information are stored within the LOB low-level space map pages, the index recovery system 124 is able to recover the auxiliary index on the auxiliary table by only looking at the LOB low-level space map pages. That is, by looking at a LOB low-level space map page, the index recovery system 124 can instantly identify which LOB pages contain which LOB values. Once the location of LOB values is known, the index recovery system 124 recreates an auxiliary index.

The index recovery system 124 can scan each LOB low-level space map page, looking for LOB page entries that indicate any LOB page which is the first LOB page on which a particular LOB value begins. Once the index recovery system 124 finds such a LOB page, the index recovery system 124 computes the LOB page number for the LOB page entry, and then builds the key value for the auxiliary table, with the key value identifying the LOB value that is stored starting at this LOB page.

Figure 5:
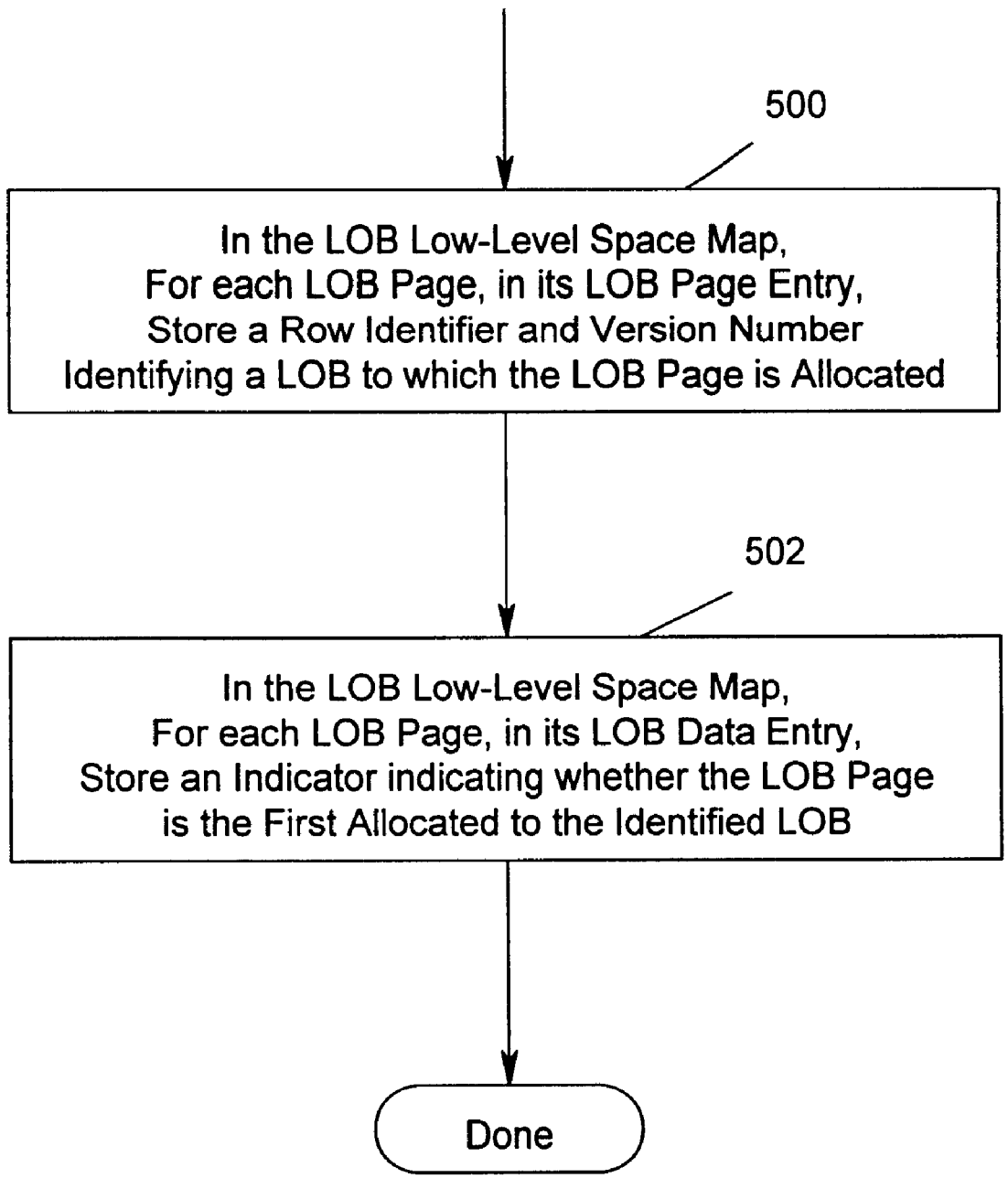
FIG. 5 is a flow diagram illustrating the steps performed by the data manager to store information in a LOB space map.

FIG. 5 is a flow diagram illustrating the steps performed by the data manager 118 to store information in a LOB space map. In Block 500, the data manager 118 stores, in the LOB space map, for each LOB page, in its LOB page entry, a row identifier and a version number identifying a LOB to which the LOB page is allocated. In Block 502, the data manager 118 stores, in the LOB space map, for each LOB page, in its LOB page entry, an indicator indicating whether the LOB page is the first LOB page allocated to the identified LOB.

Figure 6:
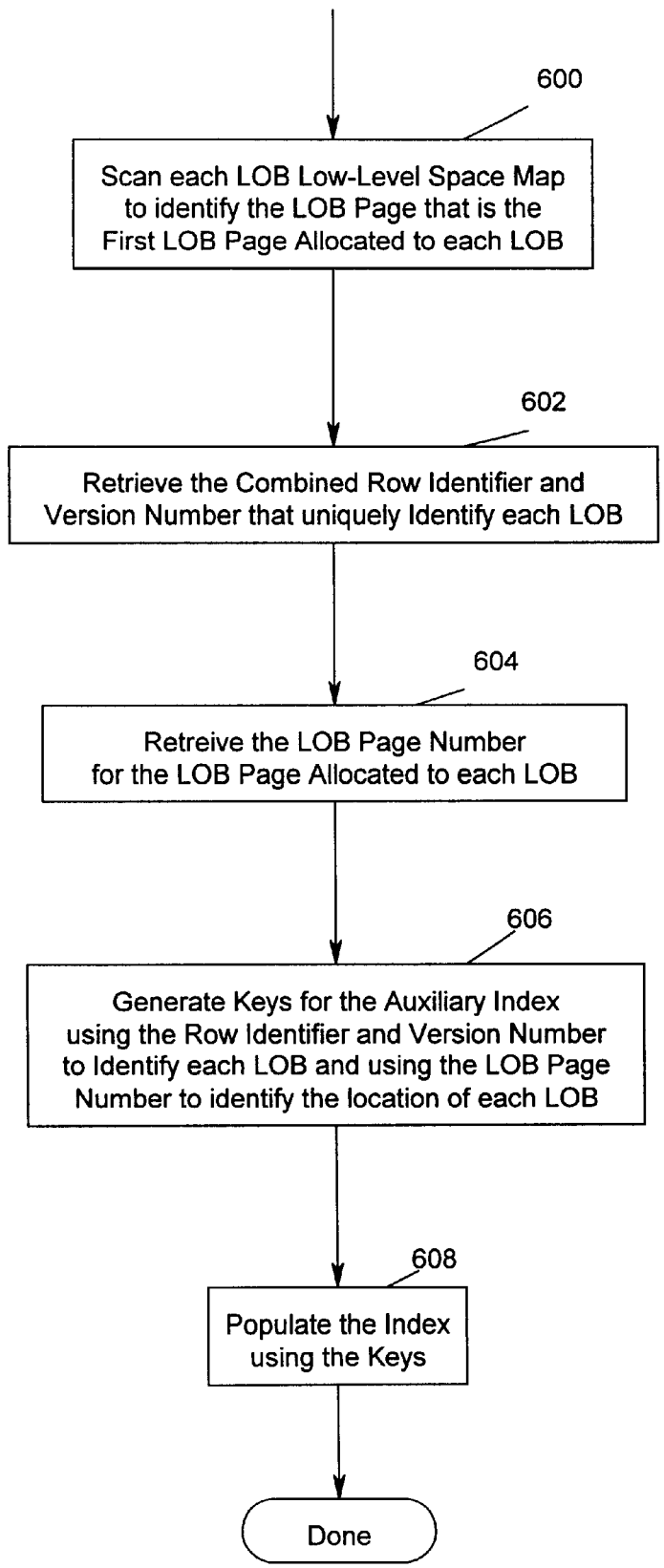
FIG. 6 is a flow diagram illustrating the steps performed by the index recovery system to recover an index.

FIG. 6 is a flow diagram illustrating the steps performed by the index recovery system 124 to recover an index. In Block 600, the index recovery system 124 scans each LOB space map to identify the LOB page that is the first LOB page allocated to each LOB. In Block 602, the index recovery system 124 retrieves the combined row identifier and version number that uniquely identify each LOB. In Block 604, the index recovery system 124 retrieves the LOB page number for the LOB page allocated to each LOB. In Block 606, the index recovery system 124 generates keys for the auxiliary index using the row identifier and version number to identify each LOB and using the LOB page number to identify the location of each LOB. In block 608, the index recovery system 124 populates the index using the keys. To populate the index, the records to be inserted into the index are scanned, the keys for the records are extracted and sorted, and then the index is built with the sorted keys.

The index recovery system 124 avoids scanning any LOB pages. By only reading the LOB low-level space map pages, the index recovery system 124 greatly decreases the amount of time that is required for the auxiliary index recovery. For example, for a LOB table space utilizing 32K pages, each LOB low-level space map page covers 1600 LOB pages. When recovering an auxiliary index on such a LOB table space, only about 0.06 percent of the LOB table space needs to be read for the recovery (about 1/1600th). For 4K pages, LOB low-level space map pages cover 192 pages, so only about 0.5 percent of the LOB table space needs to be read. In addition to a reduction in the LOB pages read, the LOB low-level space map pages that are read are always allocated in chunks of 16 pages, which allows prefetch to still be utilized.

Besides being valuable for recovery of the auxiliary index, the index recovery system 124 is also very beneficial to the CHECK INDEX utility, because all the information needed for CHECK is contained within the LOB low-level space map pages.

In an alternative embodiment, the requirement for an index on the auxiliary table may be relaxed in favor of an approach that stores pointers to the LOB values within the base table rows. In the alternative embodiment of the invention, indexes are not required, and, thus, the index recovery system 124 comprises a recovery system for recovering a base table. In particular, if the LOB table space is reorganized, or recovered to a point in time, it will be necessary to rebuild the pointers within the base table to point to the moved LOB entries. Again, in this case, the recovery system would only scan the LOB low-level space map pages to identify the first LOB page on which a LOB value begins and correct the pointers to LOB values in the base table to point to the correct LOB pages.

Figure 7:
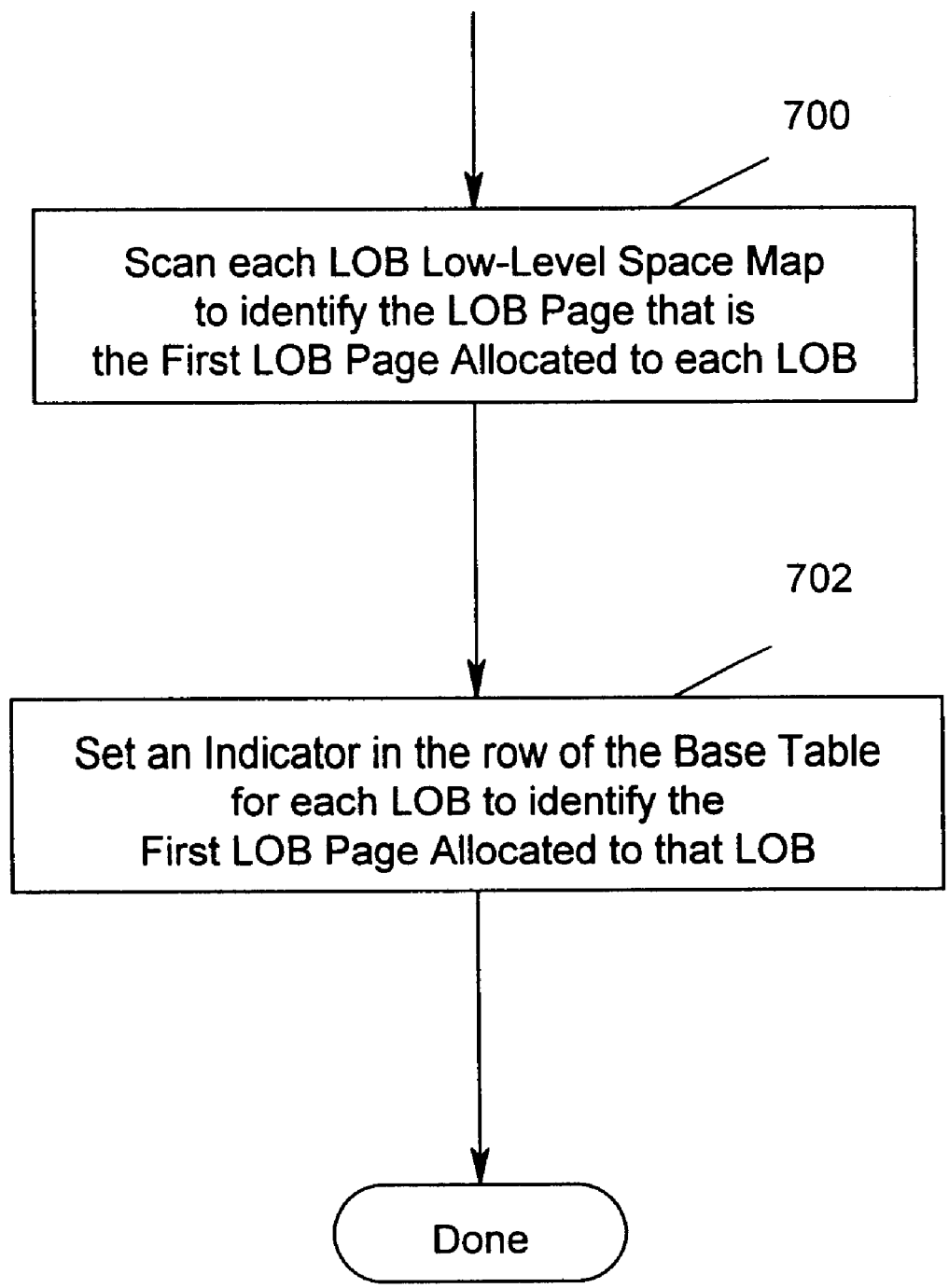
FIG. 7 is a flow diagram illustrating the steps performed by the recovery system to recover a portion of a base table in an alternative embodiment.

FIG. 7 is a flow diagram illustrating the steps performed by a recovery system to recover a portion of a base table in an alternative embodiment. In block 700, the recovery system scans each LOB space map to identify the LOB page that is the first LOB page allocated to each LOB. In block 702, the recovery system sets an indicator in the row of the base table for each LOB to identify the first LOB page allocated to that LOB.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of recovering an auxiliary index in a database is stored on a data storage device connected to a computer, the method comprising:

maintaining an identifier in each entry of a space map that identifies a large object to which the page associated with that entry is allocated;

maintaining an indicator in the entry of the space map indicating whether the page associated with that entry is a first page allocated to the large object; and using the identifier and the indicator in each entry of the space map to build the auxiliary index for locating each large object.

2. The method of claim 1, wherein maintaining an identifier further comprises maintaining a unique identifier comprising a combination of a row identifier and a version number.

3. The method of claim 1, wherein maintaining an indicator further comprises maintaining a bit in each space map entry.

4. The method of claim 1, wherein using the identifier and the indicator in each entry of the space map to build an auxiliary index further comprises:

scanning each space map to identify each page that is the first page allocated to a large object; and generating a key for the auxiliary index that identifies the large object and the first page allocated to the large object.

5. The method of claim 4, wherein the key for the auxiliary index comprises a combination of a row identifier and a version number to identify the large object and a page number to identify the location of the large object.

6. The method of claim 1, wherein using the identifier and the indicator in each entry of the space map to build an auxiliary index further comprises:

scanning the space map to identify each page that is a first page allocated to a large object; and setting an indicator in a row of a base table to identify the first page allocated to the large object.

7. An apparatus for recovering an auxiliary index, comprising:

a computer having a data storage device connected thereto, wherein the data storage device stores a database;

one or more computer programs, performed by the computer, for maintaining an identifier in each entry of a space map that identifies a large object to which the page associated with that entry is allocated, maintaining an indicator in the entry of the space map indicating whether the page associated with that entry is a first page allocated to the large object, and using the identifier and the indicator in each entry of the space map to build the auxiliary index for locating each large object.

8. The apparatus of claim 7, wherein the one or more computer programs that maintain a unique identifier further comprise a combination of a row identifier and a version number.

9. The apparatus of claim 7, wherein the one or more computer programs that maintain an indicator further comprise one or more computer programs that maintain a bit in each space map entry.

10. The apparatus of claim 7, wherein the one or more computer programs using the identifier and the indicator in each entry of the space map to build an auxiliary index further comprise:

one or more computer programs that scan each space map to identify each page that is the first page allocated to a large object; and one or more computer programs that generate a key for the auxiliary index that identifies the large object and the first page allocated to the large object.

11. The apparatus of claim 10, wherein the key for the auxiliary index comprises a combination of a row identifier and a version number to identify the large object and a page number to identify the location of the large object.

12. The apparatus of claim 7, wherein the one or more computer programs using the identifier and the indicator in each entry of the space map to build an auxiliary index further comprise:

one or more computer programs that scan the space map to identify each page that is a first page allocated to a large object; and one or more computer programs that set an indicator in a row of a base table for the large object to identify the first page allocated to the large object.

13. An article of manufacture comprising a computer program carrier readable by a computer and embodying one or more instructions executable by the computer to perform a method that recovers an auxiliary index in a database stored in a data storage device connected to the computer, the method comprising:

maintaining an identifier in each entry of a space map that identifies a large object to which the page associated with that entry is allocated;

maintaining an indicator in the entry of the space map indicating whether the page associated with that entry is a first page allocated to the large object; and using the identifier and the indicator in each entry of the space map to build the auxiliary index for locating each large object.

14. The article of manufacture of claim 13, wherein maintaining an identifier further comprises maintaining a unique identifier comprising a combination of a row identifier and a version number.

15. The article of manufacture of claim 13, wherein maintaining an indicator further comprises maintaining a bit in each space map entry.

16. The article of manufacture of claim 13, wherein using the identifier and the indicator in each entry of the space map to build an auxiliary index further comprises:

scanning each space map to identify each page that is the first page allocated to a large object; and generating a key for the auxiliary index that identifies the large object and the first page allocated to the large object.

17. The article of manufacture of claim 16, wherein the key for the auxiliary index comprises a combination of a row identifier and a version number to identify the large object and a page number to identify the location of the large object.

18. The article of manufacture of claim 13, wherein using the identifier and the indicator in each entry of the space map to build an auxiliary index further comprises:

scanning the space map to identify each page that is a first page allocated to a large object; and setting an indicator in a row of a base table for the large object to identify the first page allocated to the large object.

* * * * *